United States Patent
Robshaw et al.

(10) Patent No.: US 9,887,843 B1
(45) Date of Patent: *Feb. 6, 2018

(54) RFID TAGS WITH DYNAMIC KEY REPLACEMENT

(71) Applicant: Impinj, Inc., Seattle, WA (US)

(72) Inventors: Matthew Robshaw, Seattle, WA (US); Alberto Pesavento, Seattle, WA (US); Christopher Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,156

(22) Filed: Dec. 21, 2016

Related U.S. Application Data

(63) Continuation of application No. 14/318,367, filed on Jun. 27, 2014, now Pat. No. 9,565,022.

(Continued)

(51) Int. Cl.

| | |
|---|---|
| H04L 9/14 | (2006.01) |
| G06Q 30/00 | (2012.01) |
| H04L 12/04 | (2006.01) |
| H04L 29/06 | (2006.01) |
| H04W 12/06 | (2009.01) |
| H04L 9/08 | (2006.01) |
| H04L 9/30 | (2006.01) |
| G06K 7/10 | (2006.01) |
| H04L 9/06 | (2006.01) |
| H04W 12/04 | (2009.01) |

(52) U.S. Cl.
CPC ............ *H04L 9/14* (2013.01); *G06K 7/10257* (2013.01); *G06Q 30/00* (2013.01); *H04L 9/0643* (2013.01); *H04L 9/0877* (2013.01); *H04L 9/30* (2013.01); *H04L 63/06* (2013.01); *H04L 63/083* (2013.01); *H04W 12/04* (2013.01); *H04W 12/06* (2013.01)

(58) Field of Classification Search
CPC ............... G06Q 30/0185; G06Q 30/00; G06K 7/10257; G06K 7/10; H04L 9/0643; H04L 9/0877; H04L 9/14; H04L 9/30; H04L 63/083; H04L 29/06; H04L 9/08; H04L 9/06; H04L 2209/24; H04W 12/04; H04W 12/06

See application file for complete search history.

(56) References Cited

U.S. PATENT DOCUMENTS

| | | | |
|---|---|---|---|
| 7,322,040 B1 | 1/2008 | Olson et al. | |
| 7,512,236 B1 * | 3/2009 | Zhu | G06Q 20/027 380/255 |

(Continued)

*Primary Examiner* — Jung Kim
*Assistant Examiner* — James J Wilcox
(74) *Attorney, Agent, or Firm* — Turk IP Law, LLC

(57) ABSTRACT

A cryptographically-enabled RFID tag stores a primary secret key and derives secondary keys from the primary key. A secondary key may be derived by combining the primary key with one or more other parameters using one or more algorithms. The tag uses a derived secondary key to encrypt or electronically sign a tag response sent to a verifying entity. The verifying entity does not know the derived secondary key, but knows the tag primary key and the parameters and algorithms used to derive the secondary key and can derive all of the potential secondary keys. The verifying entity can then attempt to authenticate the tag or tag response by trying potential secondary keys.

20 Claims, 12 Drawing Sheets

Related U.S. Application Data

(60) Provisional application No. 61/842,319, filed on Jul. 2, 2013.

(56) References Cited

U.S. PATENT DOCUMENTS

| | | | |
|---|---|---|---|
| 7,806,325 B2 * | 10/2010 | O'Brien | G06F 21/43 235/375 |
| 8,131,281 B1 * | 3/2012 | Hildner | H04L 41/0806 455/418 |
| 8,185,744 B2 | 5/2012 | Brown et al. | |
| 8,689,013 B2 | 4/2014 | Habraken | |
| 8,719,938 B2 | 5/2014 | Chaska et al. | |
| 8,719,952 B1 | 5/2014 | Damm-Goossens | |
| 8,751,806 B1 | 6/2014 | Adler | |
| 8,866,594 B1 | 10/2014 | Diorio et al. | |
| 8,941,469 B1 * | 1/2015 | Diorio | H04L 9/3247 340/10.1 |
| 8,978,118 B2 * | 3/2015 | Aichroth | H04L 9/006 705/1.1 |
| 9,111,283 B1 * | 8/2015 | Diorio | H04L 9/3247 |
| 9,129,168 B1 * | 9/2015 | Diorio | G06K 7/10009 |
| 9,129,169 B1 * | 9/2015 | Diorio | G06K 7/10009 |
| 9,154,480 B1 | 10/2015 | Juels | |
| 9,154,481 B1 * | 10/2015 | Juels | H04L 63/08 |
| 9,501,675 B1 * | 11/2016 | Diorio | H04L 9/0816 |
| 9,565,022 B1 * | 2/2017 | Robshaw | H04L 9/14 |
| 9,740,891 B1 * | 8/2017 | Robshaw | G06K 7/10009 |
| 2001/0042043 A1 * | 11/2001 | Shear | G06F 21/10 705/51 |
| 2002/0099649 A1 * | 7/2002 | Lee | G06Q 20/04 705/38 |
| 2004/0093372 A1 | 5/2004 | Chen et al. | |
| 2006/0107307 A1 * | 5/2006 | Knox | H04L 63/0492 726/2 |
| 2006/0224355 A1 * | 10/2006 | Morrison | G01G 19/415 702/173 |
| 2007/0078817 A1 * | 4/2007 | Girao | H04W 12/04 |
| 2007/0103274 A1 * | 5/2007 | Berthold | G06K 19/0723 340/10.51 |
| 2007/0109124 A1 | 5/2007 | Park et al. | |
| 2007/0136583 A1 * | 6/2007 | Diorio | G06Q 10/08 713/168 |
| 2007/0136584 A1 * | 6/2007 | Diorio | G06Q 10/087 713/168 |
| 2007/0136585 A1 * | 6/2007 | Diorio | G06F 21/35 713/168 |
| 2008/0100442 A1 * | 5/2008 | Grunwald | H04L 63/20 340/572.1 |
| 2008/0100443 A1 * | 5/2008 | Grunwald | H04L 63/0492 340/572.1 |
| 2008/0226066 A1 | 9/2008 | Yi et al. | |
| 2008/0290994 A1 * | 11/2008 | Bruns | H04L 63/0428 340/10.1 |
| 2009/0136027 A1 * | 5/2009 | Salowey | H04L 63/0492 380/45 |
| 2009/0159666 A1 * | 6/2009 | O'Brien | G06F 21/43 235/380 |
| 2009/0282249 A1 * | 11/2009 | Aamknecht | H04L 9/0841 713/171 |
| 2009/0300197 A1 | 12/2009 | Tanizawa et al. | |
| 2010/0289627 A1 * | 11/2010 | McAllister | G06Q 10/087 340/10.42 |
| 2010/0308978 A1 | 12/2010 | Brown | |
| 2011/0016937 A1 * | 1/2011 | Downes | A45C 11/328 70/393 |
| 2011/0033052 A1 * | 2/2011 | Yamada | H04L 9/0877 380/270 |
| 2011/0291803 A1 * | 12/2011 | Bajic | G08B 13/2462 340/10.1 |
| 2011/0302264 A1 * | 12/2011 | Lawrence | G06Q 10/087 709/207 |
| 2012/0017264 A1 | 1/2012 | Hanna | |
| 2012/0075475 A1 | 3/2012 | Mariadoss | |
| 2012/0121084 A1 * | 5/2012 | Tomlinson | H04L 9/30 380/30 |
| 2012/0128157 A1 * | 5/2012 | Braun | G06F 21/445 380/270 |
| 2012/0163587 A1 * | 6/2012 | Chang | H04L 9/0618 380/28 |
| 2012/0201381 A1 | 8/2012 | Miller et al. | |
| 2012/0237024 A1 * | 9/2012 | Liu | H04L 9/0869 380/44 |
| 2012/0319815 A1 * | 12/2012 | Feldman | G06Q 30/0185 340/5.8 |
| 2013/0067213 A1 * | 3/2013 | Liu | H04L 9/0819 713/150 |
| 2014/0123172 A1 | 5/2014 | Sprunk et al. | |
| 2014/0123220 A1 | 5/2014 | Sprunk et al. | |
| 2014/0266591 A1 * | 9/2014 | Klammer | G07C 9/00111 340/5.65 |
| 2014/0286491 A1 * | 9/2014 | Atherton | G06K 7/10267 380/270 |
| 2014/0334622 A1 | 11/2014 | Smyth et al. | |
| 2015/0043735 A1 | 2/2015 | Fujii et al. | |
| 2015/0071441 A1 | 3/2015 | Hinz et al. | |
| 2016/0034728 A1 * | 2/2016 | Oliver | G06K 7/10257 340/10.1 |
| 2016/0034881 A1 * | 2/2016 | Post | G06Q 20/204 705/17 |
| 2016/0078215 A1 | 3/2016 | Robshaw et al. | |
| 2016/0094531 A1 | 3/2016 | Unnikrishnan et al. | |
| 2016/0110571 A1 | 4/2016 | Jung et al. | |
| 2016/0110725 A1 * | 4/2016 | Bright | A61J 1/00 705/318 |
| 2016/0301450 A1 * | 10/2016 | Rosenberg | H04B 5/0062 |

* cited by examiner

SIGNAL PATH DURING R→T

SIGNAL PATH DURING T→R

RFID TAGS WITH DYNAMIC KEY REPLACEMENT

CROSS REFERENCE TO RELATED APPLICATIONS

This application is a continuation application under 35 U.S.C. § 120 of U.S. patent application Ser. No. 14/218,367, now U.S. Pat. No. 9,565,022, filed on Jun. 27, 2014, which claims the benefit under 35 U.S.C. § 119 (e) of U.S. Provisional Patent Application Ser. No. 61/842,319 filed on Jul. 2, 2013. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags.

Advances in semiconductor technology have miniaturized the electronics so much that an RFID tag can be powered solely by the RF signal it receives. Such RFID tags do not include an energy storage device such as a battery, and are called passive tags. Of course, even passive tags typically include temporary energy- and data/flag-storage elements such as capacitors or inductors.

Counterfeiting is a problem in many areas of global commerce. Many RFID-enabled applications need to verify the authenticity of the RFID tags, readers, and system components used in the application. For example, a retailer receiving a shipment of tagged items often needs to determine whether the tags, and by implication the items to which the tags are attached, are genuine or counterfeit.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments are directed to RFID tags using derived secondary keys for interactions with other tags or readers. A cryptographically-enabled RFID tag stores a primary secret key and derives secondary keys from the primary key. A secondary key may be derived by combining the primary key with one or more other parameters using one or more algorithms. The tag uses a derived secondary key to cryptographically secure (i.e., encrypt or electronically sign) a tag response sent to a verifying entity or to perform some cryptographic operation on the tag. The verifying entity does not know the derived secondary key, but knows the tag primary key and the parameters and algorithms used to derive the secondary key and can derive all of the potential secondary keys. The verifying entity can then attempt to authenticate the tag or tag response by trying potential secondary keys.

Other embodiments are directed to RFID tags using stored secondary keys for interactions with other tags or readers. A cryptographically-enabled RFID tag stores a number of secondary keys, and selects one of the stored secondary keys to cryptographically secure a tag response sent to a verifying entity. The verifying entity does not know the specific secondary key used to cryptographically secure the tag response but knows the secondary keys stored at the tag. The verifying entity then attempts to authenticate the tag or tag response by trying potential secondary keys.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
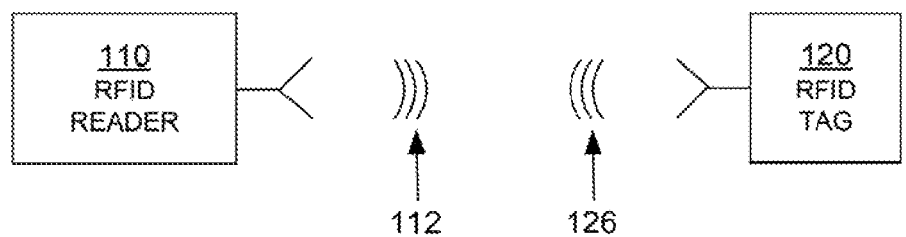
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GSI EPCglobal, Inc. ("Gen2 Specification"), versions 1.2.0 and 2.0 of which are hereby incorporated by reference.

In some applications, RFID systems are called upon to ensure the authenticity of an item to which a tag is attached. In these systems a reader challenges the tag and asks the tag to "prove" that it is genuine and not counterfeit. If the tag is genuine, then the item to which it is attached is presumed also to be genuine, especially if the tag is embedded into or onto the item and is difficult to alter or remove. In this case the task of preventing an item from being counterfeited essentially becomes a task of preventing the tag that is attached to the item from being counterfeited.

Preventing a tag from itself being counterfeited is difficult. For example, one way in which a tag can be counterfeited is by using a replay attack. In a replay attack, a counterfeiter listens to the communications between a reader and a legitimate tag and creates a counterfeit tag that mimics or "clones" the legitimate tag's response. To prevent such cloning, each time a reader challenges a tag both the reader and the tag should send different and unpredictable (at least unpredictable by the counterfeiter) messages. Typical cryptographic systems provide such unpredictability by having the reader send a different random challenge to the tag for each authentication, and having the tag generate a different response for each random challenge. In many systems the tag also adds some of its own randomness to the challenge so as to further confound attacks. Many challenge-response methods are known and applicable to this use case. Some challenge-response methods use what are known as symmetric cryptographic algorithms, such as the Advanced Encryption Standard (AES). Others use what are known as asymmetric or public key cryptographic algorithms, such as the Rivest/Shamir/Adleman (RSA) algorithm.

Regardless of whether an RFID system uses a symmetric or an asymmetric cryptographic algorithm, each tag contains a stored secret, also known as a secret key, a private key, or sometimes just a key. Symmetric algorithms typically denote the stored secret as a "secret key". Asymmetric algorithms typically denote the stored secret as a "private key". For symmetric algorithms, the secret key is known to both the tag and any verifying authorities, but not to a counterfeiter. For asymmetric algorithms, only the tag knows its private key, but the corresponding public key may be available to verifying authorities and to potential counterfeiters alike. In either case, to authenticate a tag a random challenge is sent to the tag; the tag uses its cryptographic algorithm to compute a response from the challenge and its stored secret; the tag sends the response; and an authority verifies the response by decrypting it using the tag's secret key (symmetric algorithm) or public key (asymmetric algorithm). U.S. patent application Ser. Nos. 12/155,057, 13/308,123, 13/396,889, and 13/441,285, filed on Jun. 7, 2011, Nov. 30, 2011, Feb. 15, 2012, and Apr. 6, 2012, respectively, describe such authentication methods, and are hereby incorporated by reference in their entireties.

In some cases, a tag may further protect its secret key from disclosure by using secondary keys for actual cryptographic interactions. The secondary keys may be generated from or be otherwise associated with the secret key, and different secondary keys may be used for different cryptographic interactions. Using these secondary keys in cryptographic interactions provides an additional layer of protection for the secret key, since the replacement secondary keys can be used and changed more frequently than an underlying secret key.

A verifying entity (e.g., a reader, a computer or server coupled to the reader, an authority, another tag, or some other entity) that attempts to verify a message secured with a secondary key may not know the exact identity of the secondary key. However, the verifying entity knows the tag's secret key and how the tag generates secondary keys from the secret key. Accordingly, the verifying entity can generate a set of potential secondary keys which includes the correct secondary key and a number of decoy secondary keys and attempt to verify the message using each of the potential keys.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
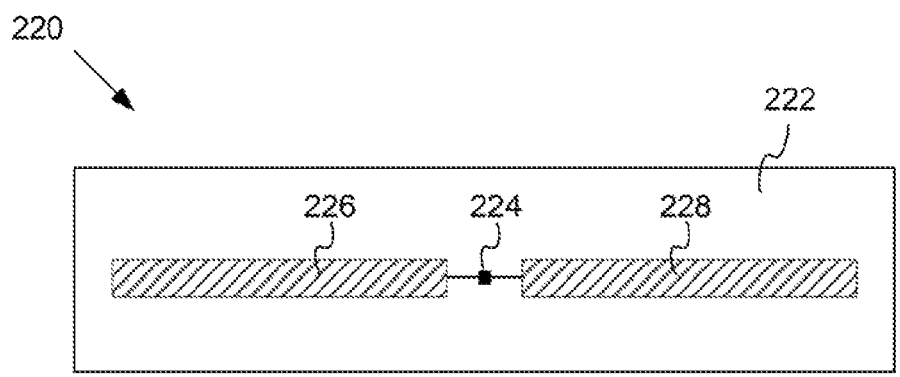
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
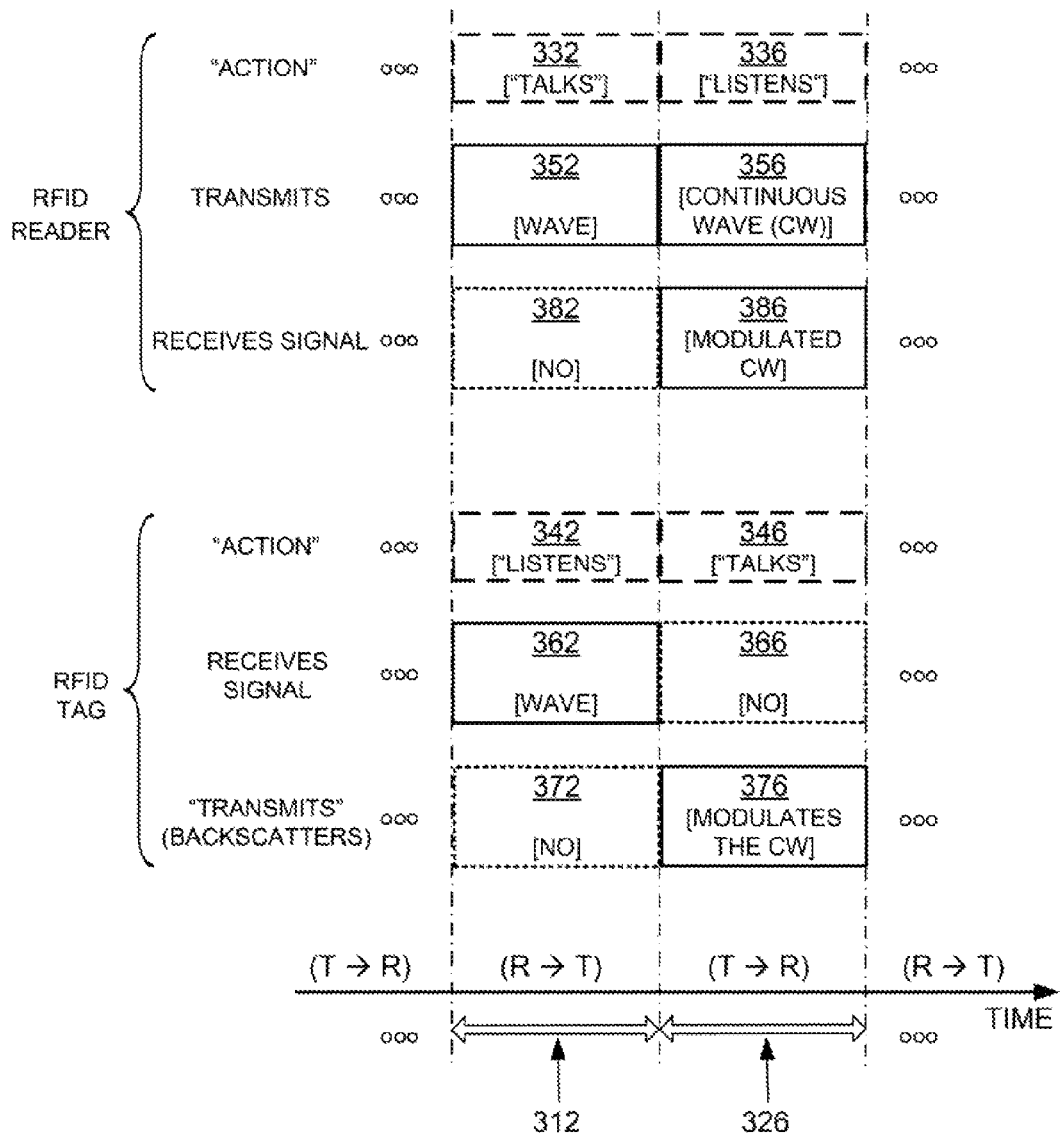
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
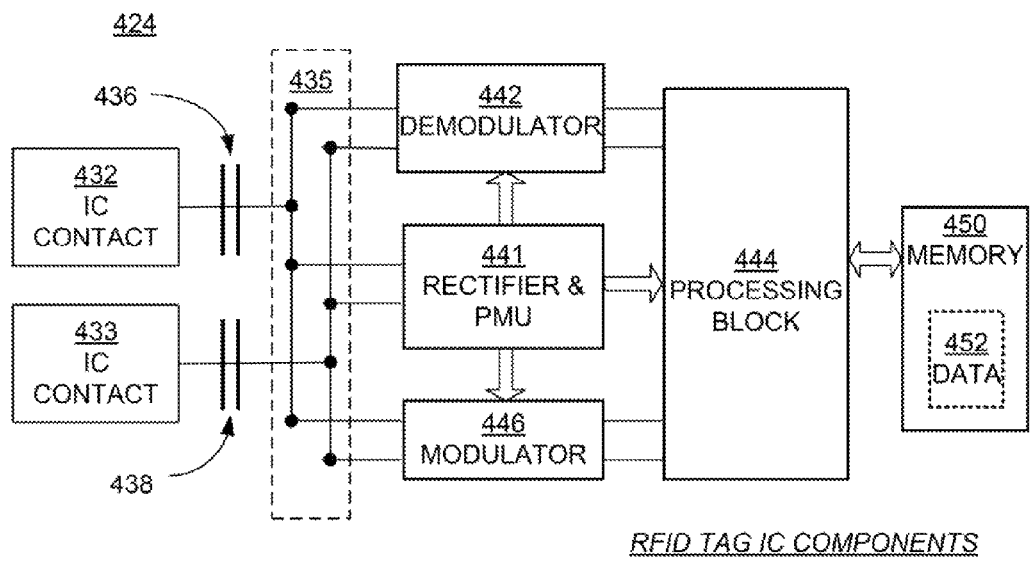
FIG. 4 is a block diagram showing a detail of an RFID IC, such as IC 224 in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
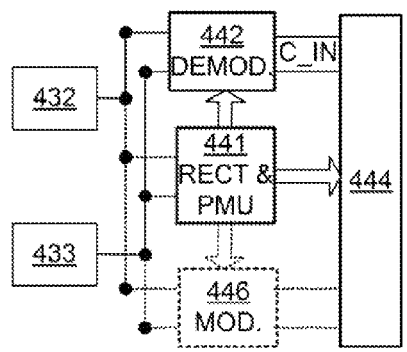
FIG. 5A shows version 524-A of components of circuit 424 of FIG. 4, further modified to emphasize a signal operation during a R→T session during time interval 312 of FIG. 3.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
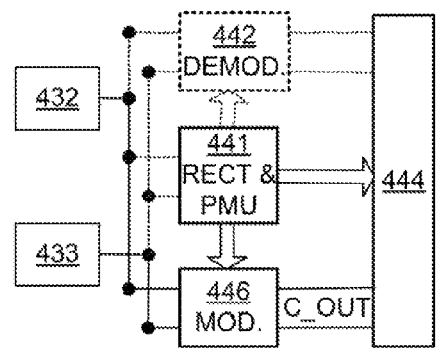
FIG. 5B shows version 524-B of components of circuit 424 of FIG. 4, further modified to emphasize a signal operation during a T→R session during time interval 326 of FIG. 3.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
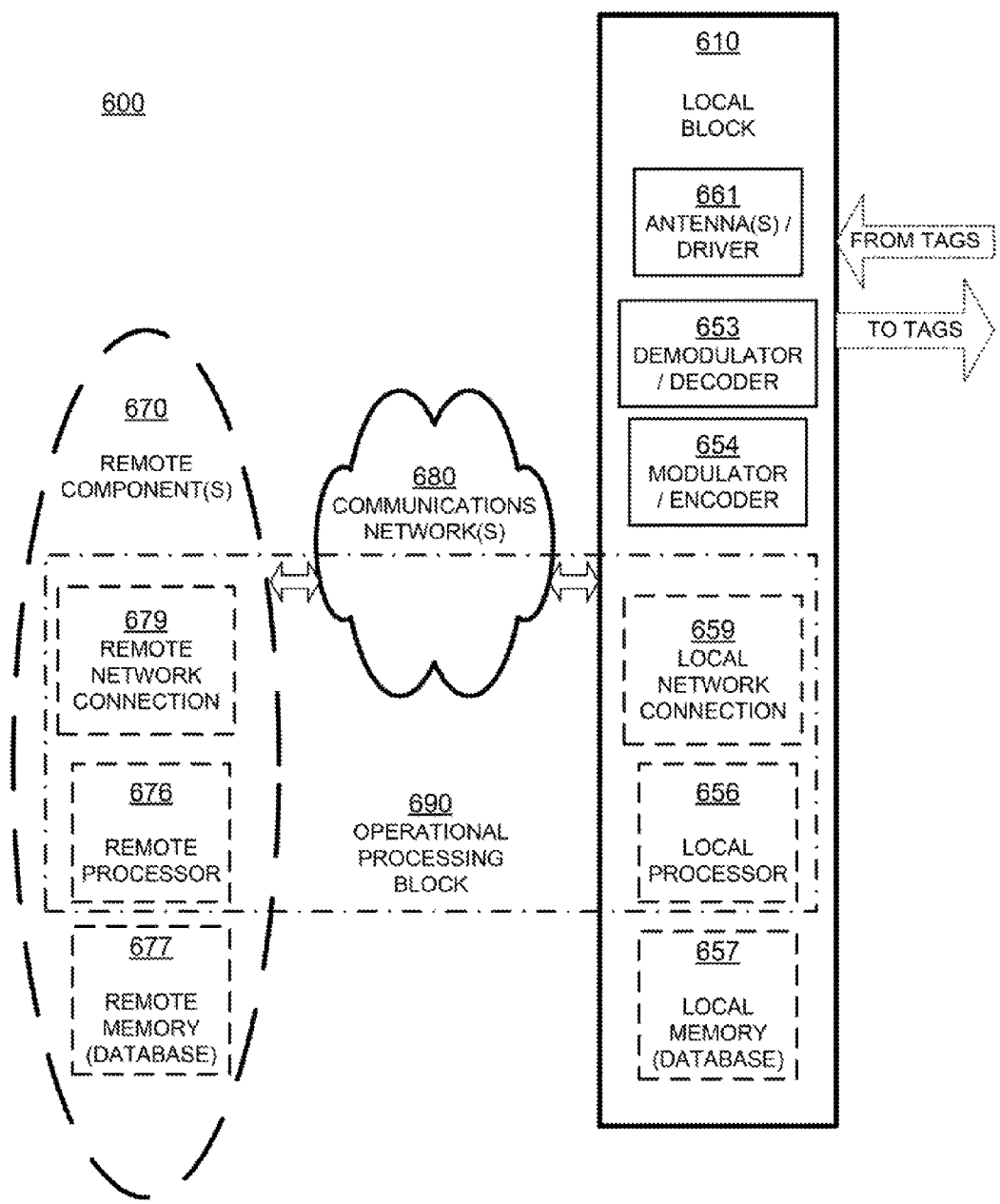
FIG. 6 is a block diagram showing a detail of an RFID reader, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

Local block 610 is responsible for communicating with the tags. Local block 610 includes a block 651 of an antenna and its driver. Some readers, like that shown in local block 610, contain a single antenna and driver. Some readers contain multiple antennas and/or drivers and a method to switch signals among them, including sometimes using different antennas for transmitting and for receiving. Some readers contain multiple antennas and drivers that operate simultaneously. A demodulator/decoder block 653 demodulates and decodes waves received from the tags via antenna/driver block 651. Modulator/encoder block 654 encodes and modulates an RF wave to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authorization function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to the EPC or TID codes, instructions and/or rules for how to encode commands for the tags, modes for controlling antenna 651, secret keys, key pairs, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location or in different locations. They can communicate with each other and with local block 610 via communications network 680, or via other similar networks, using remote network connection(s) 679. Only one such connection 679 is shown, which is similar to local network connection 659.

Remote component(s) 670 can also include a remote processor 676. Remote processor 676 can be made in any way known in the art, such as was described with reference to local processor 656. Remote processor 676 may also implement an encryption function, similar to local processor 656.

Remote component(s) 670 can also include a remote memory 677. Remote memory 677 can be made in any way known in the art, such as was described with reference to local memory 657. Remote memory 677 may include a local database or a different database of a standards organization, such as one that can reference EPCs. Remote memory 677 may also contain information associated with commands, tag profiles, secret keys, or the like, similar to local memory 657.

Of the above-described elements, it may be advantageous to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna 651, and cause antenna 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna block 651, with modulator/encoder block 654 encoding and modulating the information on an RF wave. Then data is received from the tags via antenna block 651, demodulated and decoded by demodulator/decoder block 653, and processed by processing operational processing block 690.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
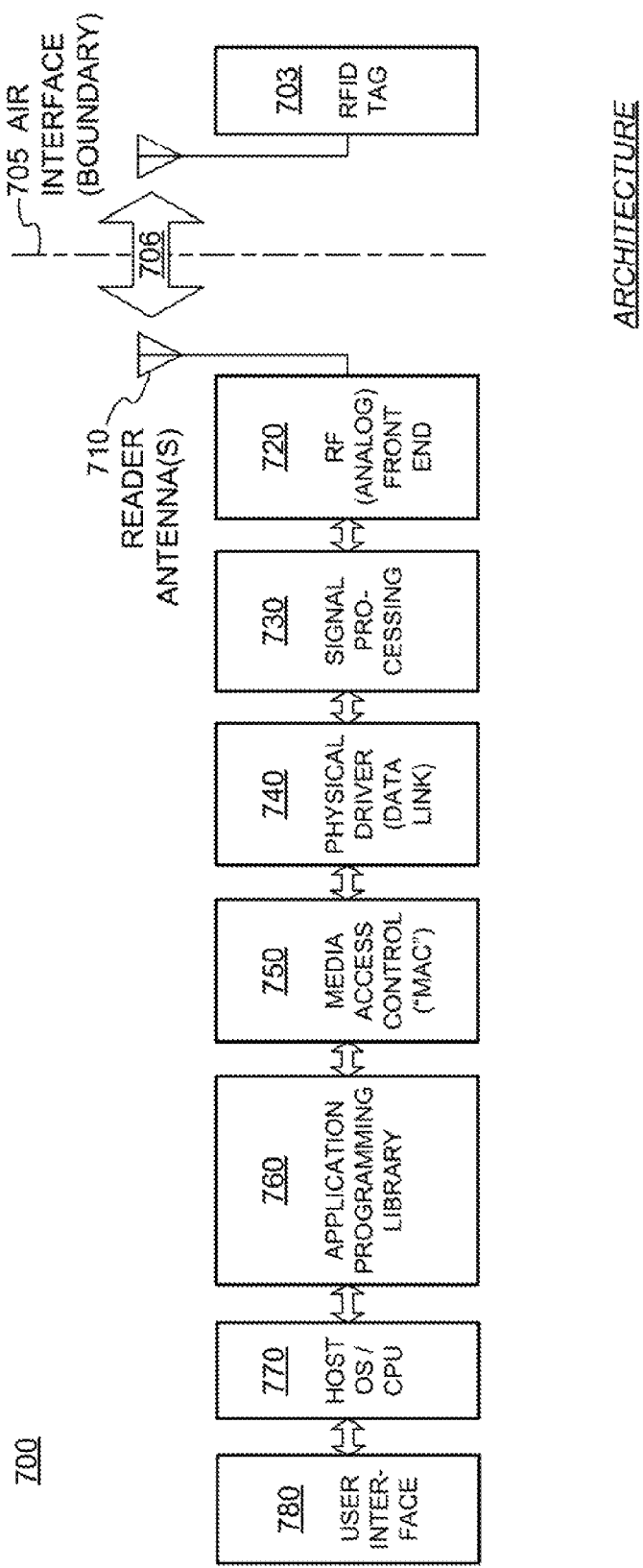
FIG. 7 is a block diagram illustrating an overall architecture of an RFID system according to embodiments.

FIG. 7 is a block diagram illustrating an overall architecture of an RFID system 700 according to embodiments. It will be appreciated that RFID system 700 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 703 is considered here as a module by itself. RFID tag 703 conducts a wireless communication 706 with the remainder via air interface 705. It is noteworthy that air interface 705 is only a boundary, in that signals or data that pass through it are not intended to be transformed from one thing to another. Protocols as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as a data-link module. In some embodiments physical-driver module 740 exchanges data with signal-processing module 730. Physical-driver module 740 can be the stage associated with the framing of data.

RFID system 700 additionally includes a media access control module 750. In one embodiment, media access control module 750 exchanges data packets with physical driver module 740. Media access control module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving identification data from a tag, challenging the tag, and verifying the tag response through interaction with a verifying authority. In some embodiments the one or more processors may verify an electronic signature, create a tag challenge, and verify a tag response.

User interface module 780 may be coupled to application-programming-library module 760, for accessing the APIs. User interface module 780 can be manual, automatic, or both, and can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 710 to be transmitted as wireless waves. In receiving mode, reader antenna(s) 710 receives wireless waves, which are in turn processed successively by the various modules in the chain. Processing can terminate in any one of the modules.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to providing secure records of RFID tag interactions, using a verification tag to authenticate RFID tag interactions, and/or using a verification tag to authorize RFID tag operations. Embodiments additionally include programs, and methods of operation of the programs. A program is generally defined as a group of steps or operations leading to a desired result, due to the nature of the elements in the steps and their sequence. A program is often implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. The storage medium can be implemented in any number of ways known in the art, including, by way of example, and not of limitation, any of the memory types described above as well as any combination thereof.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet. Often, for the sake of convenience only, it is desirable to implement and describe a program as software. The software can be unitary, or thought of in terms of various interconnected distinct software modules.

Figure 8:
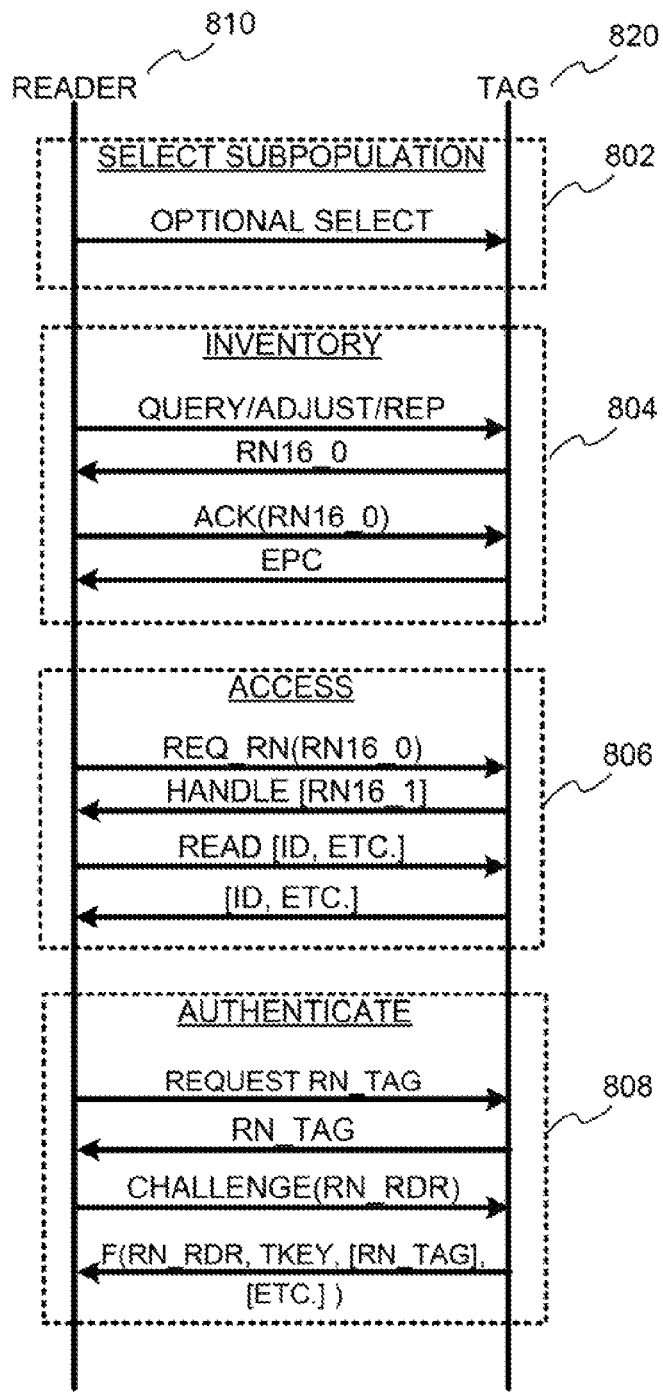
FIG. 8 illustrates a sequence of communications signals between a reader and a tag according to embodiments.

FIG. 8 illustrates command-response exchanges 800 between a reader 810 and a tag 820 according to embodiments. The sequence of signals proceeds downward chronologically (i.e., lower signals occur later), with signals from the reader 810 to the tag 820 indicated by arrows pointing right and signals from the tag 820 to the reader 810 indicated by arrows pointing left. Although the commands and responses in diagram 800 of FIG. 8 assume that the reader 810 and tag 820 are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 8. Other orderings are possible; exchanges can be merged, enhanced, or eliminated; and the authentication can be spread across various operations between reader and tag.

The interactions between reader 810 and tag 820 in diagram 800 begin with an optional tag subpopulation selection 802, where the reader 810 selects one or more tags from a tag population for inventorying and/or authentication. For example, the reader 810 may broadcast a selection command that includes one or more criteria to the tag population. The criteria in the selection command may include one or more tag flag values, at least a portion of a tag identifier, and/or at least a portion of other data that can be stored on tags. Tags in the population that meet the one or more criteria, for example having tag flag values and/or stored data that match the tag flag value(s) and/or data specified in the selection command may be considered as "selected". In some embodiments, the selection command may be the Select command of the Gen2 Specification.

Reader 810 then performs an inventory 804 to singulate an individual tag from the tag population (or from within a subpopulation of selected tags, if the reader performed optional tag selection 802). In some embodiments, the reader performs the inventory 804 according to the Query-ACK sequence described in the Gen2 Specification. In the Gen2 Query-ACK sequence, a reader first transmits a Query/QueryAdj/QueryRep command. A tag that meets the criteria for responding may then reply with a 16-bit random/pseudorandom number RN16_0. Upon receipt of the RN16_0, the reader transmits an Acknowledge command (ACK) with the RN16_0 to the tag, which may then respond with its EPC.

After performing the inventory 804, the reader then performs an access 806 in order to access and read tag information from the tag singulated in inventory 804. The tag may store (and the reader may access) an identifier ID (which may be the tag's EPC or another tag identifier) and optionally one or more other parameters, such as a tag random number. The reader may begin the access 806 by transmitting a REQ_RN command with the RN16_0 received in inventory 804, which requests a new random/pseudorandom number from the tag for use as a tag handle. The tag then responds with a RN16_1 handle. The reader then transmits a read request to read the optional ID and/or any other optional parameters. Upon receiving the read command sent by the reader, the tag transmits the requested information to the reader.

The reader then challenges the tag in an authentication step 808. In the authentication step 808, the reader may first optionally request a tag random number RN_TAG from the tag, which may be used to enhance the security of authentication step 808. RN_TAG may have been previously stored in the tag, generated in situ, or generated in situ and then stored in the tag. In some embodiments the tag may generate RN_TAG using its TKEY or by reading a tag random number that was previously stored in tag memory. After generating RN_TAG, the tag transmits it to the reader. The tag may encrypt the RN_TAG before transmission. In some embodiments, the tag may generate an initial value (IV) based on RN_TAG and TKEY and transmit the IV to the reader in addition to or instead of RN_TAG.

The reader then transmits a challenge to the tag. A challenge is a message that contains a random number (which may be encrypted) and one or more cryptographic parameters. The challenge instructs a receiving entity, such as a tag or reader, to determine a cryptographic response based on the random number, the cryptographic parameter(s), and entity information such as an entity key, an entity identifier, or any other suitable entity information. The receiving entity may itself compute the cryptographic response using a cryptographic algorithm, or may have another entity compute and provide the cryptographic response to the receiving entity. The challenge may be determined based on the random number and/or a tag random number. A challenge may originate from another tag, a reader, or some other entity. In the situation described in diagram 800, the challenge originates from the reader, includes reader random number RN_RDR, and may also include the RN_TAG (or IV if used). Upon receiving the challenge, the tag computes a response to the challenge based on the RN_RDR, the TKEY, other cryptographic parameters included in the challenge, the RN_TAG or IV, the tag handle (RN16_1), another tag random number such as the RN16_0, and/or any other suitable parameter. In some embodiments, the tag may use a tag random number different from the RN_TAG originally sent to the reader to generate the response. For example, the tag random number used to generate the response may be derived from RN_TAG based on some algorithm or may be entirely independent of RN_TAG. The tag then sends the computed response to the reader. At this point the reader may be able to verify the tag's response using the RN_RDR, the RN_TAG/IV, and/or any other previously-received or known parameter. For example, the reader may itself verify the tag's response, or the reader may send the challenge, the received tag response, and other information to a verification authority for verification. Some challenge-response variants do not use a tag random number or IV; others may include a command count or a message-authentication code; others may include the reader encrypting the random number in the reader-tag challenge; and yet others may include fewer or more steps than shown.

As described above, embodiments include different orderings of interactions between reader and tag. For example, in some embodiments the reader sends a challenge during tag selection 802, preceding the access 806, and the tag computes its response and stores the response in memory for subsequent reading by a reader. The tag's computation may also include a tag random number (e.g., RN_TAG, an IV, the tag handle, and/or RN16_0), and the tag may store the tag random number for subsequent access by the reader. Indeed, in embodiments where the challenge occurs during tag selection, and reading the response occurs during tag access, authentication 808 need not exist, because its operations have been spread among select 802 and access 806. One reason a reader may choose to send the challenge with select 802 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 802. In some embodiments, a challenge that is transmitted to an individual tag may be an Authenticate command of the Gen2 Specification, and a challenge that is broadcast to multiple tags may be a Challenge command of the Gen2 Specification.

As mentioned above, the commands and signals in sequence 800 do not have to be performed in the particular order shown, or even grouped as shown. The commands and signals may be separated, combined, or interspersed among each other. For example, an interrogated tag may transmit its tag ID with its response to a reader challenge, instead of providing its tag ID in inventory 804 or access 806. The tag may transmit its tag ID with its response as consecutive messages, or may concatenate the response with the tag ID, for example by prepending the response with the tag ID, appending the tag ID to the tag response, or otherwise combining the tag ID and the response in the same message. As another example, the reader may send the request for the tag random number during the optional tag selection 802. Because the select signal in tag selection 802 is broadcast to a population of tags, multiple tags may receive the reader's tag random number request. In response, each tag that receives the tag random number request may generate its own tag random number and then store the tag random number in tag memory. The reader may then subsequently read each tag (e.g., in access 806) to retrieve the stored tag random number.

In some embodiments the reader sends a challenge during tag selection 802, preceding the access 806, and the tag computes its response and stores the response in memory for subsequent reading by a reader. The tag's computation may also include a tag random number (e.g., RN_TAG, an IV, the tag handle, and/or RN16_0), and the tag may store the tag random number for subsequent access by the reader. Indeed, in embodiments where the challenge occurs during tag selection, and reading the response occurs during tag access, authentication 808 need not exist, because its operations have been spread among select 802 and access 806. A reader may choose to broadcast the tag random number request and/or the challenge to multiple tags in the optional select 802 in order to allow all of the tags that hear the broadcast to simultaneously generate their tag random number and compute their responses. In contrast to the authenticate step 808, where each tag generates its tag random number and challenge-response serially (i.e., one tag after another), enabling multiple tags to perform these operations in parallel is faster. Due to the time-intensive nature of the cryptographic computations involved in generating tag random numbers or challenge/responses, the time saved by allowing tags to compute in parallel instead of serially can be substantial. In some embodiments, the challenge itself may be sent to multiple tags simultaneously, separately from select 1202. In some embodiments, a challenge that is transmitted to an individual tag may be an Authenticate command of the Gen2 Specification, and a challenge that is broadcast to multiple tags may be a Challenge command of the Gen2 Specification.

Whereas authenticate step 808 in sequence 800 includes a tag random number, in some embodiments step 808 may not use or include a tag random number. In some embodiments, a tag authentication may include a command count (e.g., a count from the reader indicating the number of commands it has transmitted or a count from the tag indicating the number of commands it has received) and/or an electronic signature. Other authentication steps may include more or fewer steps than the particular authenticate step 808 shown in sequence 800.

As described above, a cryptographically-enabled RFID tag may use secondary keys when interacting with other readers or tags. For example, a tag that stores multiple primary or secondary keys may select one of the primary or secondary keys for use during communications with a reader or other tag. As another example, a tag may generate different secondary keys based on a primary tag key known to or stored at the tag.

Figure 9:
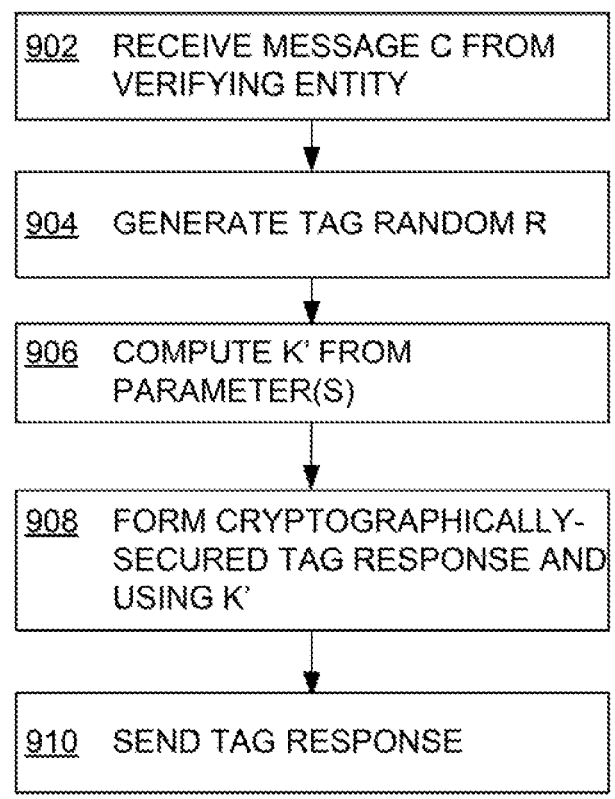
FIG. 9 is a flowchart illustrating a process for a tag to generate dynamic keys according to embodiments.

FIG. 9 is a flowchart illustrating a process 900 for a tag to generate dynamic keys according to embodiments. In step 902 a tag with a primary tag key K receives a message C from a verifying entity, which may be a reader, a computer or server coupled to the reader, an authority, another tag, or some other entity. The tag may receive message C directly from the verifying entity, or may receive message C from a relaying entity acting as a relay for the verifying entity. The message C may include a challenge from a reader (e.g., as described in authenticate step 808), or may be a message from another entity such as another tag. The tag then generates a tag random number R in step 904. For example, the tag may use a random-number-generator to generate the tag random number. In some embodiments, the tag random number may be generated based on a predetermined or dynamic seed value known to or stored on the tag.

Subsequently, in step 906 the tag computes a secondary key K' based on a number of parameters. For example, K' may be computed from the tag primary key K, the message C received in step 902, the tag random number R generated in step 904, a counter value from a tag counter, a tag state, and/or any other suitable parameter or value. The secondary key K' may be computed from the parameters based on any suitable algorithm. For example, K' may be computed using bitwise operations (e.g., logical NOT, AND, OR, XOR, or any other suitable bitwise operation) to combine the different parameters. Of course, other algorithms or operations, such as arithmetic or logical algorithms or operations, may be used. In some embodiments, different algorithms may be applied to one or more of the different parameters before being used to compute K'. For example, a given parameter may be truncated, extended, subject to a bitwise operation, subject to a bit-shift operation, or otherwise adjusted. However, a parameter does not need to be adjusted, and in some embodiments a tag may use a parameter as-is, or apply an identity function to the parameter that leaves it unchanged. In some embodiments, the computation of K' may be reversible and/or computationally lightweight, but in other embodiments the K' computation process may be irreversible and/or computationally difficult. For example, reversible/computationally lightweight computations may include the bitwise operations previously described, and irreversible/computationally difficult computations may include using a hash function or other cryptographic operation to derive K'.

Once K' has been computed in step 906, in step 908 the tag forms a cryptographically-secured tag response using K'. A cryptographically-secured tag response is a tag response that is encrypted and/or electronically signed. The tag may form the cryptographically-secured tag response by first computing a tag response and then encrypting and/or electronically signing the tag response using K' and one or more appropriate cryptographic algorithms. Further, the tag response itself may be computed using a cryptographic operation and the primary or secondary key. Cryptographic algorithms that may be used include symmetric key algorithms (e.g., Digital Encryption Standard [DES] or Advanced Encryption Standard [AES]), asymmetric key algorithms (e.g., Rivest-Shamir-Adleman [RSA]), stream ciphers, block ciphers, or any other suitable algorithm. The tag may electronically sign the tag response by computing and attaching an electronic signature to the tag response. Electronic signatures are cryptographic structures used to verify that a particular, signed message (in this case, the tag response) originated from a particular source and has not been altered. The sender of a signed message generates an electronic signature based on a sender key and the original message and "signs" the message by attaching the signature. A message recipient can then cryptographically process the attached signature to determine whether it corresponds to the received message. If so the message may be presumed authentic, and if not the message may be presumed counterfeit. Electronic signatures may include digital signatures generated via asymmetric cryptographic techniques and/or message authentication codes generated via symmetric cryptographic techniques.

In some embodiments, the tag includes some of the parameters used to compute K' in the tag response. For example, the tag may include the message C or parameter(s) included in the message C, the tag random number R, the counter value (if used), or any other parameter used to compute K' in step 906. In other embodiments, the tag may not include any of the parameters used to compute K' in the tag response, or may only include characteristics associated with the parameters used to compute K' but not the actual parameters. For example, the tag may include the length of a random number used to compute K' but not the actual random number. Finally, in step 910 the tag sends the cryptographically-secured tag response to the verifying entity or to the relaying entity.

The tag may store the computed K' in memory (as described below in FIGS. 11 and 12) for future use or reference. In other embodiments, the tag may not store the computed K' in memory, and instead discard K' after using it to form a cryptographically-secured tag response. In such embodiments, the tag may compute K' and immediately use it to form a cryptographically-secured tag response without storing K'. In other embodiments, the tag may replace the primary key K with the computed secondary key K' by overwriting K with K' in memory. The tag may use different secondary keys to cryptographically secure different responses. For example, the tag may use a first K' to cryptographically secure a first response, and may use a second, different K' to cryptographically secure a second, different response. The tag may also (or instead) change the secondary key used based on the verifying entity, type of message, type of response, environmental parameters (e.g., time, RF noise, reader density, operating region, etc.), or any other suitable criterion.

In some embodiments, a tag may store a number of primary keys, and the secondary key K' may be derived or selected from one or more of the stored primary keys. For example, the exact primary key(s) used to derive K' may be based on the tag random number R. The selected primary key or combination of primary keys may then be used as K', or may be used in the computation of K' as described above. In some embodiments, a computed secondary key K' or some value derived from a computed secondary key K' may replace its corresponding primary key K.

Figure 10:
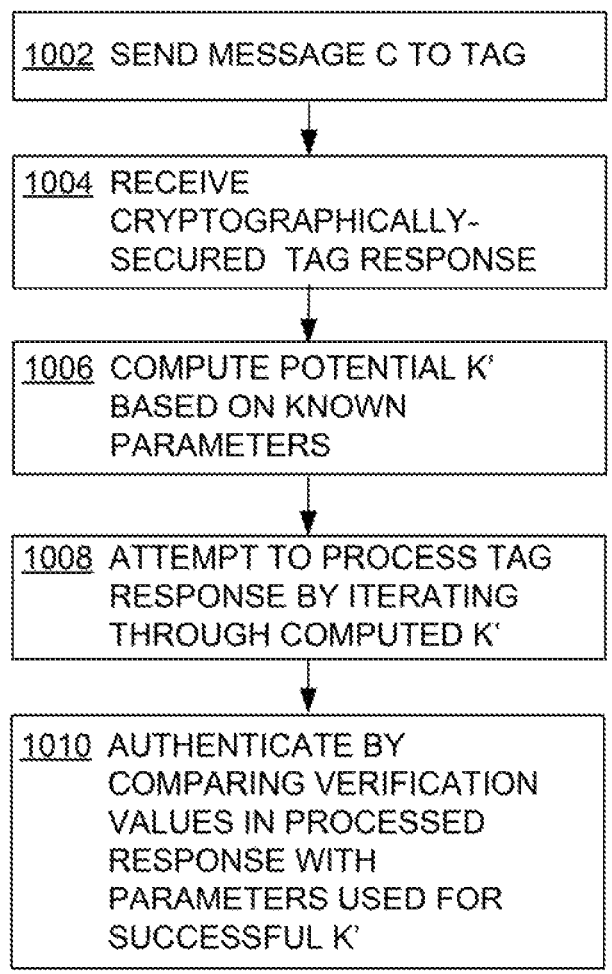
FIG. 10 is a flowchart illustrating a process for a reader to authenticate a tag configured to use dynamic keys according to embodiments.

FIG. 10 is a flowchart illustrating a process 1000 for a verifying entity to authenticate a tag configured to use dynamic keys according to embodiments. The verifying entity (e.g., a reader, a computer or server coupled to the reader, an authority, another tag, or some other entity) first sends a message C to a cryptographically-enabled tag in step 1002, then receives a cryptographically-secured tag response in step 1004 similar to the cryptographically-secured tag response described in process 900. In step 1006, the verifying entity may use a cryptographic module to compute potential secondary keys that could have been used to cryptographically-secure the received tag response. The set of potential secondary keys computed by the verifying entity includes the secondary key actually used to cryptographically secure the response and one or more decoy secondary keys not used to cryptographically secure the response. For example, as described above in FIG. 9, a tag may use several parameters to generate the secondary key K' used to cryptographically secure a tag response. The reader knows the type of parameters used (i.e., whether a message C, parameter(s) in the message C, a seed value, a counter value, and/or a tag random number R was used), and also knows the values or range of values for those parameters. For example, suppose that the tag computes the secondary key using a primary key K, a message C, and a tag random number R. The verifying entity may know that the secondary key was computed using K, C, and an R. The verifying entity may separately store or otherwise have access to the value of K, and knows the value of C, because it sent C to the tag in step 1002. The verifying entity may not explicitly know the value of R used, but it may separately know some other characteristic of R. For example, the verifying entity may know that the tag is configured to use R having a certain length. The verifying entity can then determine all of the possible R values that the tag could have used to generate the secondary key, and can therefore compute all of the potential secondary keys the tag could have used. The types, characteristics, and values or value ranges of the parameters used to generate the secondary key K' may be stored at the verifying entity, stored at a different location accessible to the verifying entity, derivable by the verifying entity based on stored or received information, and/or received from the tag.

In some embodiments, as described above, the tag may further adjust one or more of the parameters used to compute the secondary key. In these embodiments, the verifying entity may also know the parameters that have been adjusted and/or the algorithms used by the tag to adjust the parameters, and can therefore compute all of the potential secondary keys the tag could have used to cryptographically-secure the tag response. For example, the tag may generate a relatively short random number, concatenate copies of the random number together to form a longer R of arbitrary length, and use the longer R to compute the secondary key. This may limit the number of potential secondary keys the verifying entity computes, while further obscuring any relation between the replacement secondary key and the primary key.

As another example, a tag may use the value of a tag counter to compute the secondary key (in addition to the primary key K, the message C, and/or the tag random number R). The tag counter may count the number of tag authentication attempts, and may be synchronized with a corresponding counter stored by the verifying entity. When the verifying entity attempts to process (i.e., verify or decrypt) a response from the tag, it may generate a number of potential secondary keys based on the counter value at the verifying entity (and some values surrounding the counter value, to account for legitimate failed authentications). In other embodiments, the counter value may be included in the tag response instead of (or in addition to) being used to compute the secondary key.

After the potential secondary keys have been computed in step 1006, the verifying entity may then attempt to process the cryptographically-secured tag response in step 1008 by iterating through the computed potential secondary keys. If the verifying entity succeeds in processing the tag response with a computed secondary key in step 1008, thereby recovering a processed tag response, in step 1010 the verifying entity may compare the parameters it used to compute the secondary key with parameters (also known as "verification values") included in the processed tag response. For example, as described above in reference to step 908 in FIG. 9, a tag may include parameters used to generate K' (e.g., message C, tag random number R, etc.) in a tag response before cryptographically securing the tag response using K'. Upon processing the cryptographically-secured tag response the verifying entity may compare the parameters it used to generate the secondary key with verification values in the processed tag response. If the parameters correspond to the verification values, then the verifying entity may consider the tag authentic. If the parameters do not correspond to the verification values, then the verifying entity may consider the tag suspect. Similarly, if the verifying entity fails to process the tag response in step 1008, it may also consider the tag suspect.

In some embodiments, if a tag counter value was used to compute the secondary key or otherwise included in the tag response, the tag counter value may be compared with the value of the synchronized counter at the verifying entity. If the values are not sufficiently close, then the verifying entity may conclude that the tag was previously attacked by being forced to repeatedly perform authentication (causing its counter to increment but not causing the synchronized counter at the reader to increment).

The steps described in processes 900 and 1000 are for illustrative purposes only. RFID cryptographic interactions using dynamic keys may be implemented using additional or fewer steps and in different orders using the principles described herein.

In another embodiment, a tag may store a number of secondary keys instead of determining secondary keys from a primary key. In this embodiment, a tag may select a secondary key from its multiple stored secondary keys to use in cryptographically-securing a message to a verifying entity, such as a reader, a tag, or any other suitable verifying entity. The verifying entity does not know the specific secondary key used to cryptographically secure the message, but does know the secondary keys stored at the tag. The verifying entity can therefore iterate through the secondary keys known to be stored at the tag to attempt to authenticate the cryptographically-secured message. If the message is authenticated, then the verifying entity may consider the message and/or the originating tag authentic. If the verifying entity cannot authenticate the message after all the secondary keys have been tried, it may consider the message and/or the originating tag suspect.

Figure 11:
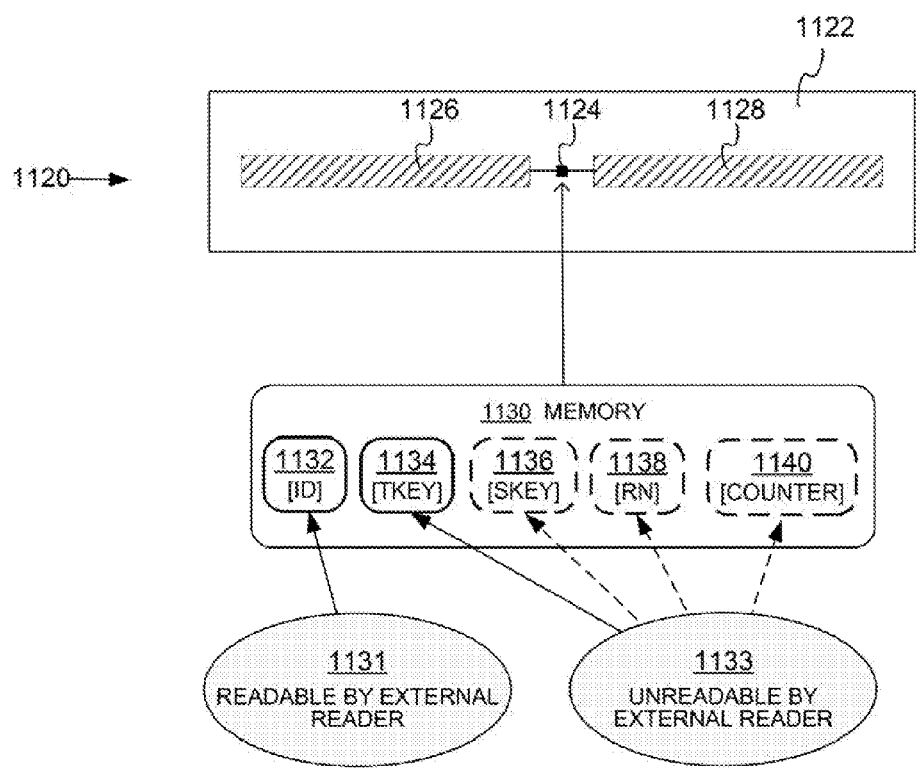
FIG. 11 illustrates an RFID tag configured to store an identifier and other data according to embodiments.

FIG. 11 illustrates a tag 1120 configured to store an identifier and other data according to embodiments. Tag 1120, similar to tag 220 depicted in FIG. 2, includes an IC 1124 (similar to IC 224 in FIG. 2) with a tag memory 1130 configured to store an identifier ID 1132, a tag secret key TKEY 1134, and any other suitable data. ID 1132 identifies the tag 1120/IC 1124, an item to which the tag 1120 is attached, or both, and may include a tag identifier (TID), a key identifier (KID), a unique item identifier (UII), an electronic product code (EPC), a serialized trade identification number (SGTIN), or any other suitable identifier or identification code. TKEY 1134 is associated with the tag 1120/IC 1124, and is used to cryptographically secure or process messages sent from or received by the tag 1120. In some embodiments, each individual RFID tag or group of tags may be associated with a distinct tag key.

Tag memory 1130 may be partitioned into an externally-readable portion 1131 and an externally-unreadable portion 1133. Data stored in the externally-readable portion 1131 may be accessed by external devices (e.g., readers) by default, and include relatively public information such as ID 1132. In contrast, data stored in the externally-unreadable portion 1133 by default may not be accessible to external devices. Such data may include sensitive information such as the tag secret key TKEY 1134.

As mentioned above, tag 1120 may store or be able to dynamically generate secondary keys to use in cryptographic operations. In some embodiments, the secondary keys may be generated based on a random number RN 1138 and/or the value of a counter 1140. RN 1138 and/or counter 1140 may be stored or implemented in memory 1130 or elsewhere. For example, counter 1140 may be implemented on tag registers (e.g., linear feedback shift registers) separate from tag memory 1130. The secondary keys may be generated and used without being stored in tag memory 1130, or may be generated and stored in tag memory 1130 as SKEY 1136.

In some embodiments, SKEY 1136, RN 1138, and/or counter 1140, if present, may be stored in the externally-unreadable portion 1133 and therefore not publicly accessible. In other embodiments, RN 1138 and/or counter 1140 may instead be stored in externally-readable portion 1131 or be otherwise publicly accessible.

Figure 12:
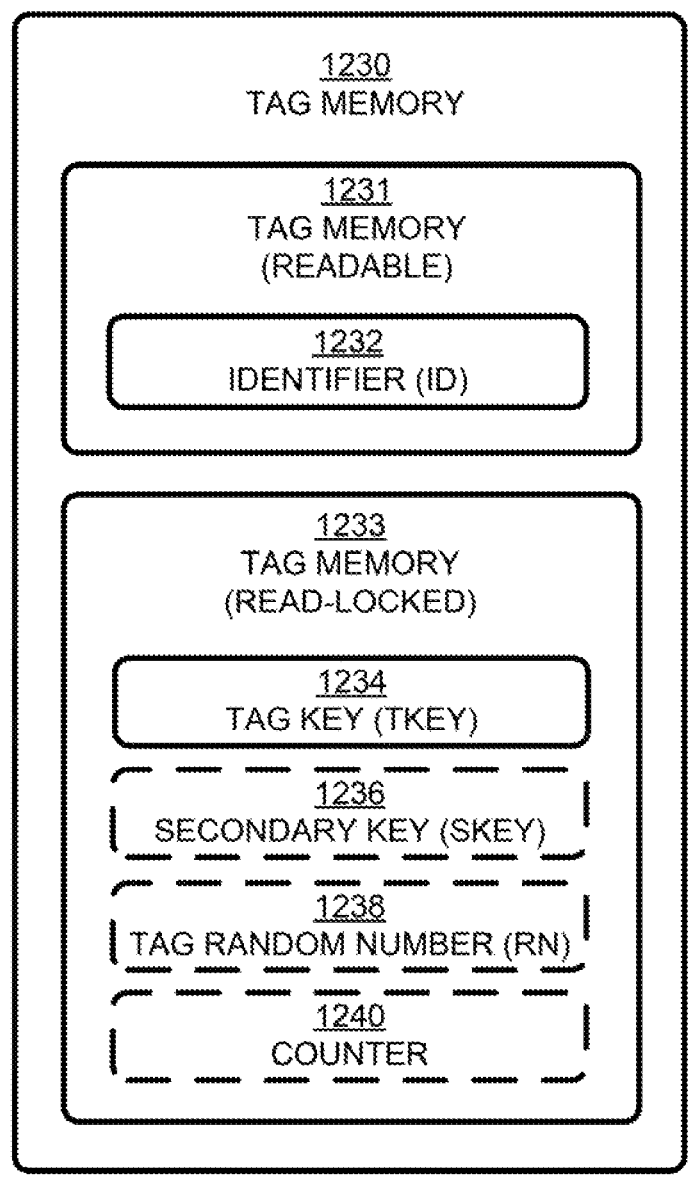
FIG. 12 illustrates a tag memory configuration according to one embodiment.

FIG. 12 depicts a configuration of a tag memory 1230 according to one embodiment. Tag memory 1230 is similar to tag memory 1130 (FIG. 11), and includes at least two tag memory portions 1231 and 1233. Whereas in some embodiments the tag memory portions 1231 and 1233 may be portions of a single memory bank or physical memory, in other embodiments the portions 1231 and 1233 may each comprise separate memory banks, multiple memory banks, or multiple physical memories.

Tag memory portion 1231, as with memory portion 1131 (FIG. 11), is configured to store ID 1232 (similar to ID 1132 in FIG. 11) and be readable by an external device such as a reader. Similarly, tag memory portion 1233 is akin to memory portion 1133 (FIG. 11) in that it is configured to store sensitive data and usually is unreadable by an external device. For example, tag memory portion 1233 may store tag key 1234 (e.g., TKEY 1134), one or more secondary keys 1236 (e.g., SKEY 1136), a tag random number 1238 (e.g., RN 1138), and/or a counter 1240 (e.g., counter 1140). In some embodiments ID 1232, TKEY 1234, SKEY 1236, RN 1238, and/or counter 1240 may be encrypted.

In some embodiments, one or more memory portions may be configured to be unwriteable ("write-locked") to prevent an external device from writing to the memory portions and potentially overwriting and damaging already-written data. For example, tag memory portion 1231 may be write-locked to prevent damage to or loss of the ID 1232. Similarly, tag memory portion 1233 may be write-locked to prevent an external device from damaging TKEY 1234, SKEY 1236, RN 1238, and/or counter 1240, if present. In some embodiments, a tag memory portion that is write-locked may still be written to by the tag itself. For example, while tag memory portion 1233 may be write-locked to prevent an external device from modifying SKEY 1236, RN 1238, and/or counter 1240, the tag itself may still be able to modify, update, or delete SKEY 1236, RN 1238, and counter 1240. In other embodiments, an authorized reader may be able to modify data in write-locked memory portions, and may be able to update, adjust, delete, or add to the stored identifiers, keys, and other data.

In some embodiments, an authorized entity such as a tag manufacturer may write data into tag memory portions before rendering the memory portions unwriteable, or may write data in some other way (e.g., via direct physical access to the memory portions). For example, a tag manufacturer may generate ID 1232 and write it into tag memory portion 1231 when the tag was manufactured or soon afterward. Similarly, the tag manufacturer may write TKEY 1234 into tag memory portion 1233, either at the same time as ID 1232 or at some other time. Alternatively, the tag supplier, verifying authority, or even another entity can perform the writing.

Figure 13:
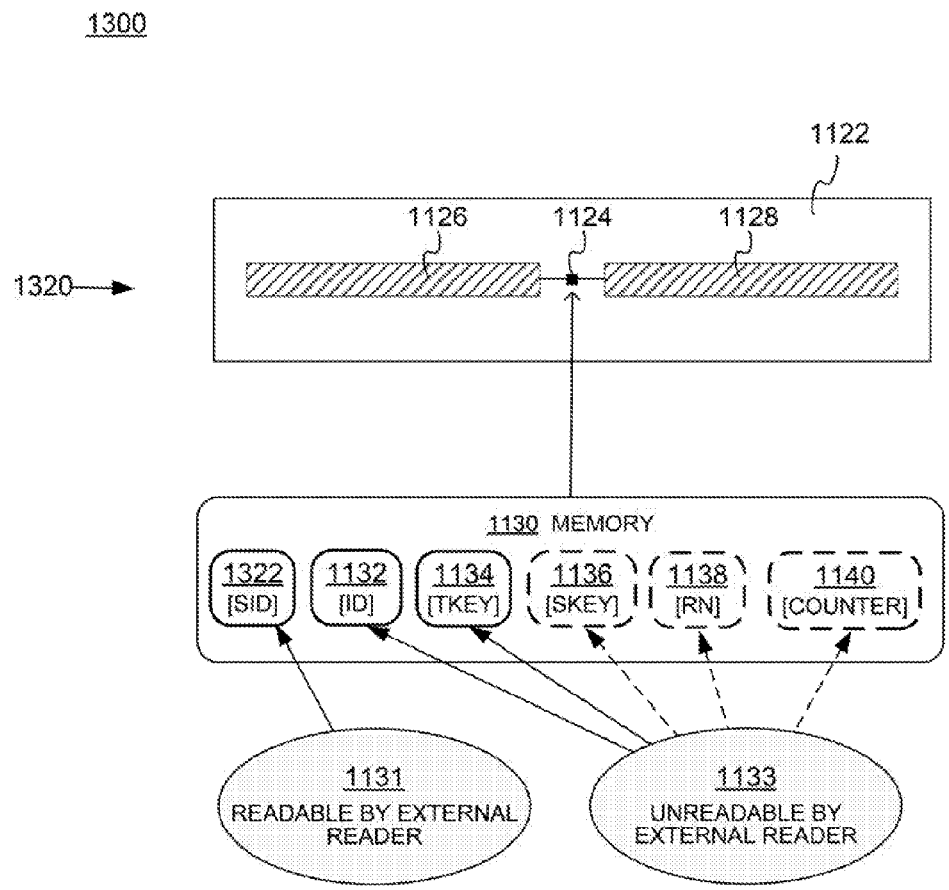
FIG. 13 illustrates an RFID tag configured to store an externally-readable secondary identifier and other data according to embodiments.

FIG. 13 illustrates an RFID tag 1320 configured to store an externally-readable secondary identifier and other data according to embodiments. Tag 1320 is similar to tag 1120, with similarly-numbered elements behaving similarly. However, tag 1320 differs from tag 1120 in that ID 1132 is stored in memory portion 1133, which is externally-unreadable. Instead, tag 1320 stores a secondary identifier SID 1322 in memory portion 1131, which is externally-readable. SID 1322 may be derived from ID 1132 in the same way SKEY 1136 is derived from TKEY 1134, and may be used in interactions with external devices to provide an additional layer of security for the tag. A legitimate reader or verifying authority knows bow SID 1322 is derived from ID 1132, and can use a process similar to the secondary key generation and decryption process described above to derive the correct secondary identifier.

Figure 14:
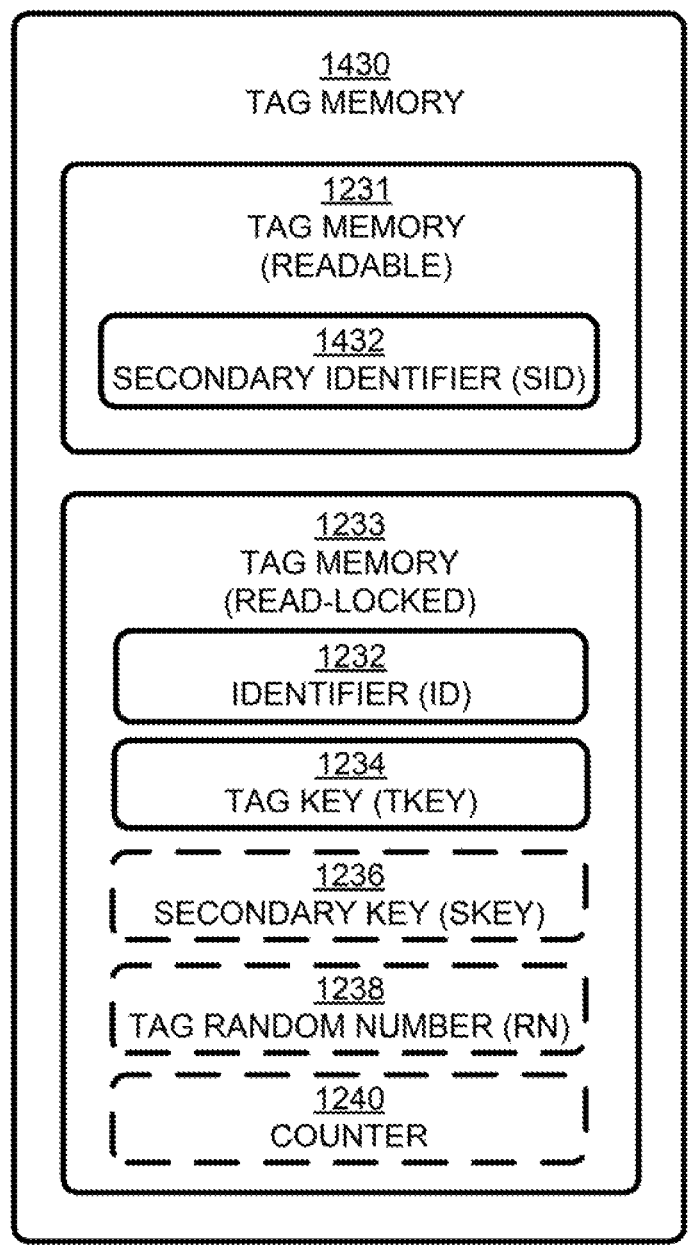
FIG. 14 illustrates a tag memory configuration according to another embodiment.

FIG. 14 illustrates the configuration of a tag memory 1430 according to another embodiment. Tag memory 1430 is similar to previously-described tag memory 1230, with similarly-numbered elements behaving similarly. As with FIG. 13, tag memory 1430 differs from tag memory 1230 in that ID 1232 is stored in externally-unreadable tag memory portion 1233, whereas secondary identifier SID 1432 derived from ID 1232 as described above is stored in externally-readable tag memory portion 1231.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method to wirelessly authenticate an item, the method comprising:
    sending a message to a Radio Frequency Identification (RFID) integrated circuit (IC) associated with the item;
    receiving, from the RFID IC, an identifier and a cryptographic response to the message;
    determining, based on the identifier, a plurality of potential keys including a used key and at least one unused key;
    generating a plurality of processed cryptographic responses, each processed cryptographic response based on the received cryptographic response and a respective potential key in the plurality of potential keys;
    extracting a verification value from a first one of the plurality of processed cryptographic responses;
    if the verification value corresponds to a known value then authenticating the item;
    else:
        extracting other verification values from the other ones of the plurality of processed cryptographic responses; and
        if the other verification values do not correspond to the known value then considering the item suspect.

2. The method of claim 1, further comprising determining the known value from a counter stored by a verifying entity.

3. The method of claim 1, further comprising:
    determining a primary key associated with the RFID IC based on the received identifier;
    determining a plurality of potential parameter values associated with the received cryptographic response; and
    determining each potential key in the plurality of potential keys based on the primary key and a respective potential parameter value.

4. The method of claim 3, wherein:
    the plurality of potential parameter values includes an actual parameter value and at least one other potential parameter value, wherein the actual parameter value is at least one of:
    used to generate the used key, and
    included in the cryptographic response; and
    the method further comprises:
        receiving a parameter characteristic associated with the actual parameter value; and
        using the parameter characteristic to determine the plurality of potential parameter values.

5. The method of claim 1, further comprising determining the plurality of potential keys based on at least one of a seed value, a counter value, a random value, a generation algorithm, a parameter length, a parameter range, and at least two parameters.

6. A cryptographic module configured to wirelessly authenticate an item, the cryptographic module comprising:
key-generation module configured to determine, based on an identifier received from a Radio Frequency Identification (RFID) integrated circuit (IC) associated with the item, a plurality of potential keys including a used key and at least one unused key; and
a processing module configured to:
send a message to the RFID IC;
receive, from the RFID IC, the identifier and a cryptographic response to the message;
determine a plurality of processed cryptographic responses, each processed cryptographic response based on the received cryptographic response and a respective potential key in the plurality of potential keys;
extract a verification value from a first one of the plurality of processed cryptographic responses;
if the verification value corresponds to a known value then authenticate the item;
else:
extract other verification values from the other ones of the plurality of processed cryptographic responses; and
if the other verification values do not correspond to the known value then consider the item suspect.

7. The cryptographic module of claim 6, wherein the processing module is further configured to determine the known value from a counter stored by a verifying entity.

8. The cryptographic module of claim 6, wherein:
the key generation module is further configured to:
determine a primary key associated with the RFID IC based on the received identifier;
determine a plurality of potential parameter values associated with the received cryptographic response; and
determine each potential key in the plurality of potential keys based on the primary key and a respective potential parameter value.

9. The cryptographic module of claim 8, wherein:
the plurality of potential parameter values include an actual parameter value and at least one other parameter value, wherein the actual parameter value is at least one of:
used to generate the used key, and
included in the cryptographic response; and
the key-processing module is further configured to:
receive a parameter characteristic associated with the actual parameter value; and
use the parameter characteristic to determine the plurality of potential parameter values.

10. The cryptographic module of claim 6, wherein the key generation module is further configured to determine the plurality of potential keys based on at least one of a seed value, a counter value, a random value, a generation algorithm, a parameter length, and a parameter space.

11. The cryptographic module of claim 6, wherein the cryptographic module is disposed within at least one of an RFID reader, a computer coupled to the RFID reader, a server coupled to the RFID reader, and an RFID IC.

12. A Radio Frequency Identification (RFID) system configured to wirelessly authenticate an item, the system comprising:
RFID integrated circuit (IC) associated with the item and configured to:
send an identifier;
receive a first challenge;
determine a secondary key based on at least one of a primary key, the received first challenge, and a first value of an IC parameter;
determine a first cryptographic response based on at least the first IC parameter value and the secondary key; and
send the first cryptographic response; and
a processor module configured to:
transmit the first challenge to the RFID IC;
receive, from the RFID IC, the identifier and the first cryptographic response;
determine, based on the identifier, a plurality of potential keys including the secondary key and at least one unused key;
determine a plurality of processed cryptographic responses, each processed cryptographic response based on the first cryptographic response and a respective potential key in the plurality of potential keys;
extract a verification value from a first one of the plurality of processed cryptographic responses;
if the verification value corresponds to the first IC parameter value then authenticate the item;
else:
extract other verification values from the other ones of the plurality of processed cryptographic responses; and
if the other verification values do not correspond to the first IC parameter value then consider the item suspect.

13. The RFID system of claim 12, wherein the RFID IC is configured to determine the first IC parameter value from at least one of a seed value, a counter value, and an IC-generated random value.

14. The RFID system of claim 13, wherein the RFID IC is configured to one of increment and decrement the counter value in response to at least one of determining the first IC parameter and sending the first response.

15. The RFID system of claim 12, wherein the RFID IC is configured to determine the first response by including at least one of the first challenge and the first IC parameter value in the first response.

16. The RFID system of claim 12, wherein the RFID IC is configured to select the primary key based on the first IC parameter value.

17. The RFID system of claim 12, wherein the RFID IC is further configured to:
receive a second challenge;
determine another secondary key based on at least one of the primary key, the second challenge, and a second IC parameter value;
determine a second cryptographic response to the second challenge based on at least the second IC parameter value and the other secondary key; and
send the second cryptographic response.

18. The RFID system of claim 12, wherein the processor module is configured to determine the first IC parameter value from a counter stored by a verifying entity.

19. The RFID system of claim 12, wherein the processor module is further configured to:
determine the primary key based on the received identifier;

determine a plurality of potential IC parameter values; and determine each potential key in the plurality of potential keys based on the primary key and a respective potential IC parameter value.

20. The RFID system of claim 19, wherein the processor module is configured to:

receive a parameter characteristic associated with the first value from the RFID IC; and determine the plurality of potential IC parameter values based on at least one of a generation algorithm, a parameter length, a parameter space, and the parameter characteristic, wherein the plurality of potential IC parameter values include the first value and at least one other value not used to generate the first response.

* * * * *